United States Patent [19]
Volkrodt

[11] 3,862,445
[45] Jan. 21, 1975

[54] STATOR STRUCTURE FOR PERMANENT MAGNET EXCITED MACHINES

[75] Inventor: Wolfgang Volkrodt, Muhlbach, Germany

[73] Assignee: Siemens Aktiengesellschaft, Munich, Germany

[22] Filed: Mar. 4, 1974

[21] Appl. No.: 447,997

[30] Foreign Application Priority Data
Mar. 5, 1973 Germany.............................. 2310948

[52] U.S. Cl. ............................... 310/154, 310/181
[51] Int. Cl. ........................................... H02k 21/26
[58] Field of Search .......... 310/159, 181, 192, 193, 360/186, 155

[56] References Cited
UNITED STATES PATENTS

| | | | |
|---|---|---|---|
| 2,666,886 | 1/1954 | Harding et al. ................. | 310/181 X |
| 2,993,134 | 7/1961 | Harvey............................ | 310/181 X |
| 3,201,625 | 8/1965 | Smith et al........................ | 310/159 |
| 3,214,620 | 10/1965 | Smith et al........................ | 310/181 |
| 3,296,471 | 1/1967 | Cochardt........................... | 310/154 |
| 3,445,702 | 5/1969 | Silva ................................ | 310/186 X |
| 3,502,923 | 3/1970 | Howell............................. | 310/192 X |
| 3,566,251 | 2/1971 | Hoylund .......................... | 310/159 X |
| 3,576,456 | 4/1971 | DeWolf............................. | 310/186 |

Primary Examiner—Donovan F. Duggan
Attorney, Agent, or Firm—Kenyon & Kenyon Reilly Carr & Chapin

[57] ABSTRACT

An improved stator structure for a permanent magnet excited machine including a plurality of laminated main pole segments disposed about the armature of the machine, a solid yoke surrounding the pole segments and the armature, and a plurality of slabs of magnetic material disposed between the yoke and the pole segments. The improvement of the invention comprises a plurality of blocks of magnetic material disposed between adjacent main poles formed by the pole segments, and a plurality of laminated reversing poles, including windings disposed thereon, positioned between the main poles adjacent to and radially further inward than the blocks of magnetic material. The reversing poles and blocks are dimensioned so as to provide lateral air gaps adjacent each of the reversing poles between the winding thereon and the blocks of magnetic material disposed adjacent thereto.

3 Claims, 1 Drawing Figure

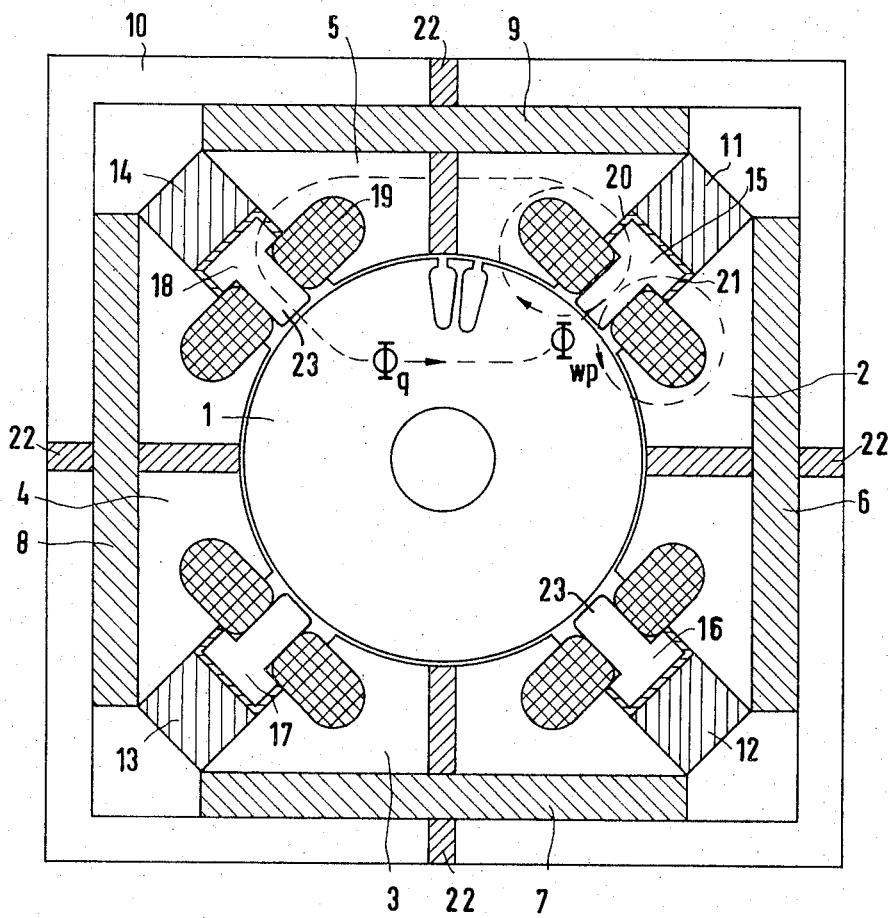

STATOR STRUCTURE FOR PERMANENT MAGNET EXCITED MACHINES

BACKGROUND OF THE INVENTION

1. Field of the Invention

This invention relates generally to permanent magnet excited machines, and in particular to an improved stator structure for such a machine.

2. Description of the Prior Art

The dynamic operation of d-c machines requires a laminated reversing pole circuit to assure that the reversing pole flux follows the armature current undamped. Generally speaking, the reversing pole flux in a convetnional d-c machine returns via the commutating poles thereof, the air gap between the poles and the armature of the machine, and the housing yoke of the machine. This characteristic of such machines requires that the machine yoke be laminated and thus increases fabrication expenses. In permanent magnet type machines having magnetically soft flux concentrator pieces, and permanent magnets clamped between these pieces, a special design is also required for the magnets with their high internal reluctance for additional reversing poles.

SUMMARY OF THE INVENTION

It is therefore an object of the invention to provide an improved stator structure for a permanent magnet excited machine which obviates the above described disadvantages of heretofore known stator structures.

This and other objects are achieved in the invention by the provision of a stator which includes a plurality of laminated main pole segments disposed about the armature of the machine, a solid yoke surrounding the pole segments and the armature, and a plurality of slabs of magnetic material disposed between the yoke and the pole segments. The improvement of the invention comprises a plurality of blocks of magnetic material which are disposed between adjacent ones of the main pole segments about the machine armature, and a plurality of reversing poles, including windings disposed thereon, positioned between the main pole segments adjacent to and radially further inward than the blocks of magnetic material. The blocks of magnetic material and the reversing poles are dimensioned so as to provide lateral air gaps adjacent each reversing pole between the winding thereon and the block of magnetic material disposed adjacent thereto.

In the described inventive stator arrangement, the reversing pole flux returns on one side via the air gap between the reversing poles and the machine armature, and on the other side via the main pole segments and the lateral air gaps provided between the pole segments and the reversing poles. The flux thus flows through laminated iron in such a stator structure and the need for a laminated yoke housing is eliminated.

BRIEF DESCRIPTION OF THE DRAWING

The drawing illustrates a sectional view of an improved stator structure for permanent magnet excited machines constructed according to the invention.

DETAILED DESCRIPTION

In the example of the inventive stator structure illustrated in the drawing, an armature 1 of the machine is surrounded by a plurality of laminated main pole segments 2, 3, 4 and 5 spaced apart therefrom. A solid return yoke 10 surrounds segments 2–5 and armature 1, as well as a plurality of slabs of magnetic material 6, 7, 8 and 9 disposed between the yoke and the main pole segments. A plurality of blocks of magnetic material 11, 12, 13 and 14 are disposed about armature 1 between adjacent main poles of the machine formed by the main pole segments. A plurality of reversing poles 15, 16, 17 and 18 are also disposed between the adjacent main poles of the machine, adjacent to and radially further inward than blocks 11–14. In the illustrated embodiment of the invention, the reversing poles are T-shaped and have the windings 19 thereof disposed about the outwardly extending, radially inwardly directed legs 23 thereof. The main pole segments are provided with recesses adjacent the reversing poles for receiving windings 19 therein. Both the reversing poles 15–18 and blocks 11–14 are dimensioned with respect to each other so that lateral air gaps 20 and 21 are provided adjacent each of the reversing poles between the winding coils 19 and blocks 11–14, in addition to an air gap formed between the reversing poles and armature 1 as in conventional machines. This structural arrangement provides a relatively large reversing pole air gap, and thus an adequate proportional relationship between the reversing pole and the armature. As shown in the illustrated embodiment of the inventive stator, air gaps 20 and 21 are preferably filled with non-magnetic material.

The air gaps on each side of the reversing poles are in parallel relationship for the reversing pole flux Iwp and in series relationship for the main pole stray flux Iq. The reversing pole magnetic flux is only a fraction of the main pole flux magnitude since the induction and cross-sectional dimension of the reversing poles are small when compared with those of the main poles. Moreover, since the reluctance encountered by the reversing pole flux is about four times greater than that encountered by the main pole flux due to the differences between the parallel and series connections, the additional main pole stray flux produced by the described arrangement is relatively insignificant. Any disadvantage of the arrangement is greatly outweighed by the feature of having a fully laminated reversing pole circuit in the stator without an expensive laminated yoke structure.

A plurality of transverse magnetic resistance means, illustrated as transverse reluctance members 22, may be disposed through the center of each main pole formed by the pole segments. Since the transverse excitation caused by the armature winding has the greatest magnetic potential drop in the transverse resistance means and not in the reversing pole air gap, only a relatively small main pole transverse flux Iq can develop as a result of the series connection of the air gaps. As a result, the reversing pole excitation and stray flux characteristics of the machine are improved, and a smaller quantity of copper for the reversing pole winding may be utilized than is required in conventional reversing pole arrangements. An improved heat flow between the reversing pole copper and the adjacent iron is also produced as a result of the large heat transfer cross-sections formed.

In the foregoing specification, the invention has been described with reference to specific exemplary embodiments thereof. It will, howver, be evident, that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a permanent magnet excited machine, a stator including a plurality of laminated main pole segments disposed about the armature of the machine, said pole segments forming a plurality of main poles about the armature, a solid yoke surrounding the pole segments and the armature, and a plurality of slabs of magnetic material disposed between the yoke and the pole segments, the improvement comprising:

a plurality of blocks of magnetic material, disposed about said armature between adjacent ones of said main poles formed by said segments; and a plurality of laminated reversing poles, including windings disposed thereon disposed between said adjacent poles adjacent to and radially further inward than said blocks of magnetic material, said reversing poles and said blocks of magnetic material being dimensioned so as to provide lateral air gaps adjacent each of said reversing poles between said windings on each of said reversing poles and said blocks of magnetic material disposed adjacent thereto.

2. The stator recited in claim 1, wherein said reversing poles are of T-shaped design and have the outwardly extending leg thereof directed inwardly towards said armature, said windings of each of said reversing poles being disposed about said inwardly directed leg.

3. The stator recited in claim 1, further comprising transverse magnetic resistance means extending through the center of said main poles formed by said main pole segments.

* * * * *